(12) United States Patent
Breitenbeck

(10) Patent No.: US 6,852,234 B2
(45) Date of Patent: Feb. 8, 2005

(54) APPARATUS AND METHOD FOR IN SITU BURNING OF OIL SPILLS

(75) Inventor: Gary A. Breitenbeck, Baton Rouge, LA (US)

(73) Assignee: The Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 10/206,548

(22) Filed: Jul. 26, 2002

(65) Prior Publication Data

US 2003/0070995 A1 Apr. 17, 2003

Related U.S. Application Data

(63) Continuation-in-part of application No. PCT/US01/41835, filed on Aug. 22, 2001.
(60) Provisional application No. 60/247,868, filed on Nov. 9, 2000.

(51) Int. Cl.[7] .................................................. C02F 1/40
(52) U.S. Cl. ........................ 210/693; 210/747; 210/776; 210/924; 431/325
(58) Field of Search ................................. 210/671, 691, 210/693, 747, 776, 922, 923, 924; 431/288, 298, 325

(56) References Cited

U.S. PATENT DOCUMENTS

| | | | | |
|---|---|---|---|---|
| 1,149,870 A | | 8/1915 | Thompson | |
| 3,589,844 A | * | 6/1971 | Kraemer et al. | 210/691 |
| 3,659,715 A | | 5/1972 | Shaler et al. | 210/242 |
| 3,663,149 A | * | 5/1972 | Heagler | 210/776 |
| 3,677,982 A | | 7/1972 | Marx | 260/2.5 |
| 3,696,051 A | | 10/1972 | McGuire et al. | 252/425.5 |
| 3,698,850 A | | 10/1972 | Sparlin | 431/8 |
| 3,843,306 A | | 10/1974 | Whittington et al. | 431/8 |
| 4,154,684 A | | 5/1979 | Tokarz | 210/242 |
| 4,290,714 A | * | 9/1981 | Strange | 210/923 |
| 4,308,006 A | * | 12/1981 | Koblanski | 210/923 |
| 4,569,656 A | | 2/1986 | Shimizu et al. | 431/325 |
| 4,959,154 A | * | 9/1990 | Simmons | 210/691 |
| 5,057,004 A | * | 10/1991 | McAllister | 210/923 |
| 5,863,440 A | * | 1/1999 | Rink et al. | 210/693 |
| 5,919,423 A | | 7/1999 | Requejo et al. | 422/126 |

* cited by examiner

Primary Examiner—Christopher Upton
(74) Attorney, Agent, or Firm—Jones, Walker, Waechter, Poitevent, Carrere & Denegre, LLP

(57) ABSTRACT

A method for in-situ burning of oil slicks on water, including the steps of: 1) providing a plurality of individual floating wicks; 2) positioning the wicks in the oil slick; and 3) igniting the wicks. Additionally, a method for manufacturing floating wicks for use in burning oil spills, including the steps of: 1) providing a wick material having a dry density less than water; 2) applying to the wick material an oleophilic, hydrophobic coating such that the coated wick material has an oil uptake capacity of at least 2 g/g and a water uptake capacity of no greater than 5 g/g; and 3) drying the wick material.

18 Claims, 4 Drawing Sheets

APPARATUS AND METHOD FOR IN SITU BURNING OF OIL SPILLS

This application is a continuation-in-part of PCT Application No. PCT/US0141835 filed on Aug. 22, 2001, which claims priority to U.S. Provisional Application No. 60/247,868 filed on Nov. 9, 2000.

TECHNICAL FIELD

The present invention relates to methods of cleaning up oil spills on bodies of water. In particular, the present invention relates to a novel method of in situ burning of oil on bodies of water.

BACKGROUND ART

In situ burning has received considerable attention in recent years as a cleanup method for oil in both upland ecosystems and on water. In situ burning involves the ignition and burning of oil spilled on water, vegetation or soils. The use of burning to address large scale oil spills at sea dates back to the Torrey Canyon incident in 1967. The failure of that and similar efforts discouraged the use of in situ burning until interest was renewed by the successful burn during the Exxon Valdez incident in 1989. Since then laboratory tests, the Mobile AL burn tests in 1991–1994, the Alaska Emulsion Burn Experiments, and the Newfoundland Offshore Burn Experiment showed that when properly managed in situ burning is a rapid, effective and environmentally safe technology for removing large quantities of floating oil. As a result, many authorities now consider burning as a valuable and effective tool rather than a method of last resort in the event of a major spill.

The ability of burning to quickly remove spilled oil and prevent its spread to sensitive sites or larger areas is perhaps burning's greatest advantage as a response strategy. Because oil is destroyed rather than collected, burning is attractive where transportation and disposal options are limited. It may be the only viable alternative in many remote locations where mechanical, dispersant and no-cleanup options are more damaging to the environment. Burning merits' special consideration for remediation of wetland environments or other oil-contaminated sites where access is limited or at sites where other methods prove ineffective or excessively intrusive. Several studies suggest that burning of spilled oil on open water and in upland environments may be more effective and more environmentally benign than intrusive mechanical and chemical treatments.

The ability of oil slicks to sustain combustion on open water depends largely on the thickness of the oil film. Oils will ignite if they are at least 2–3 mm thick and will burn down to slicks 1–2 mm thick. As oil is burned, the slick thins to a point where sufficient heat is lost to the underlying water to lower temperatures below that required to sustain combustion. In addition, "boilover" may occur when underlying water layers reach boiling temperatures, quenching the burn. Because oil on open water rapidly spreads to equilibrium thickness that is frequently less than the 2–3 mm needed for sustained combustion, heat-resistant booms are sometimes employed to entrap oil and maintain adequate thickness for efficient burning. This technique is costly and cumbersome to deploy, and therefore its use has been restricted to spills in remote yet assessable areas on relatively calm waters. Timeliness is far more critical to the success of marine burns than to inland burns where spilled oil has been successfully burned months and even years after impact. Dispersion rapidly thins most oil slicks to a degree that will not maintain combustion without confining booms. Spilled oil can rapidly emulsify when left to float on water and emulsification is accelerated by wave action. Attempts to burn heavily emulsified oil have not been successful. Evaporative losses of hydrocarbons, or weathering, results in the loss of the more easily ignited and burned volatile and semi-volatile components. Burning of heavier oils has proven difficult.

Because of the tendency of spilled oil to disperse on water, containment is required not only to prevent spreading but also to concentrate oil so that slicks are of sufficient thickness to ignite and burn efficiently. Without the benefit of containment booms, burning can only be accomplished within the first few hours after a spill event because oil rapidly spreads to equilibrium thickness. This thickness ranges between 0.01 to 0.1 mm for light crudes and fuel oils and 0.05–0.5 mm for heavy crudes and oils. In recent years, fire-resistant booms have been developed to facilitate burning and more are under development. Ideally, booms for burning should not only be fire-resistant, but lightweight, sufficiently flexible to accommodate waves, and easily deployed.

During the early development of marine burning of oil, techniques for ignition of the slick were a principal focus, no doubt because of the difficulty encountered when attempting to ignite slicks. It is now well established that slick thickness and oil type and condition are the principal factors influencing ignition and continued burning. Many devices have been devised to supply sufficient heat to ignite contained slicks with sufficient thickness for burning. They may be as simple as a roll of toilet-paper or rag soaked in diesel fuel and tossed into the slick, or as sophisticated as the "heliotorch", a device suspended from a helicopter that drops burning packets of gelled gasoline. Similar devices are used by forestry companies and agencies to create back fires and therefore are available in most localities.

In the early 1970's, prior art attempts were made to design non-combustible silicate-based foams to be applied to oil slicks as absorbent material to support burning. See U.S. Pat. No. 3,698,850 to Sparlin; U.S. Pat. No. 3,843,306 to Whittington et al.; and U.S. Pat. No. 3,696,051 to McGuire et al., 1972). It is believed that no field evaluation of these materials was ever performed. Failure to test these materials may have been the result of unfortunate timing since at the time these patents were issued, burning oil at sea was considered a problem, not a solution. Also, because these materials were not biodegradable, they posed a potential hazard to sea life. Additionally, recovery of these silicate materials by skimming apparently was not easily accomplished.

One prior art attempt at to develop a floating wick type of device is seen in U.S. Pat. No. 3,667,982 to Marx. Marx discloses a "cellulose sponge" formed of an artificial or purified cellulose material created through a conventional viscose process. This purified cellulose eliminates many constituents found in natural cellulose such as lignins, hemicelluloses, waxes, oils and other components functioning to confine water to vascular tissues and to inhibit water uptake by cellulose's structural components. Marx then treats his purified cellulose with an agent to render the cellulose material hydrophobic and oleophilic. The agent is disclosed as styrene, methyl methacrylate, or furfural methacrylate in combination with an organic peroxide such as benzoyl peroxide or methyl ethyl ketone peroxide.

However, it has been discovered that the treated cellulose sponge of Marx has several significant disadvantages. For example, when sponges manufactured according to the Marx disclosure were exposed to water alone, the sponges did often remain hydrophilic. However, when the Marx sponges were exposed to oil floating on water for any significant time (e.g. more than 0.5 hours), the sponges lost their hydrophobic character and tended to become saturated with water. Additionally, Marx's sponges did not appear to consistently burn on a 1 mm continuous slick for more than 45 minutes and failed to burn most of the oil absorbed.

Apparently the styrene/benzoyl peroxide treating agent is soluble in hydrocarbons and loses its ability to retard water uptake in a relatively short time after ignition of the sponge. Consequently, water saturation quickly limits the sponge's ability to remain ignited and efficiently burn oil on the water surface.

Another attempt at floating devices designed to facilitate burning of oil on water is illustrated in U.S. Pat. No. 4,154,684 to Tokarz. The Tokarz patent discloses a small disk constructed of a large number of hollow ceramic "microspheres" bonded together with an epoxy resin. In addition to being significantly more expensive than cellulosic materials, the ceramic disks of Tokarz are not subject to natural decay and remain buoyant, and therefore must be recovered to prevent eventual shoreline contamination. Moreover, the Tokarz disks are not digestible and unrecovered floating disks may prove a hazard to marine life. Thus, any unrecovered Tokarz disks potentially pose a significant environmental hazard.

What is needed in the art is a small, floating device to concentrate and support burning of thin films of floating oil, but which is readily recoverable and is not a danger to marine life forms. Such a floating device should be capable of overcoming the disadvantages found in devices such as disclosed in Marx and Tokarz.

SUMMARY OF THE INVENTION

The present invention provides a method for in-situ burning of oil slicks on water. The method includes the steps of: 1) providing a plurality of individual floating wicks having an effective oil/water burn time of at least five hours; 2) positioning the wicks in the oil slick; and 3) igniting the wicks.

The invention also includes a method for manufacturing floating wicks for use in burning oil spills. This method includes the steps of: 1) providing a wick material having a dry density less than water; 2) applying to the wick material an oleophilic, hydrophobic coating which provides an effective oil/water burn time of at least five hours; and 3) drying the wick material.

Finally, the invention includes an oil burning wick comprised of a cellulosic material and having an oil/water burn time of at least five hours.

BEST MODE FOR CARRYING OUT THE INVENTION

Figure 1:
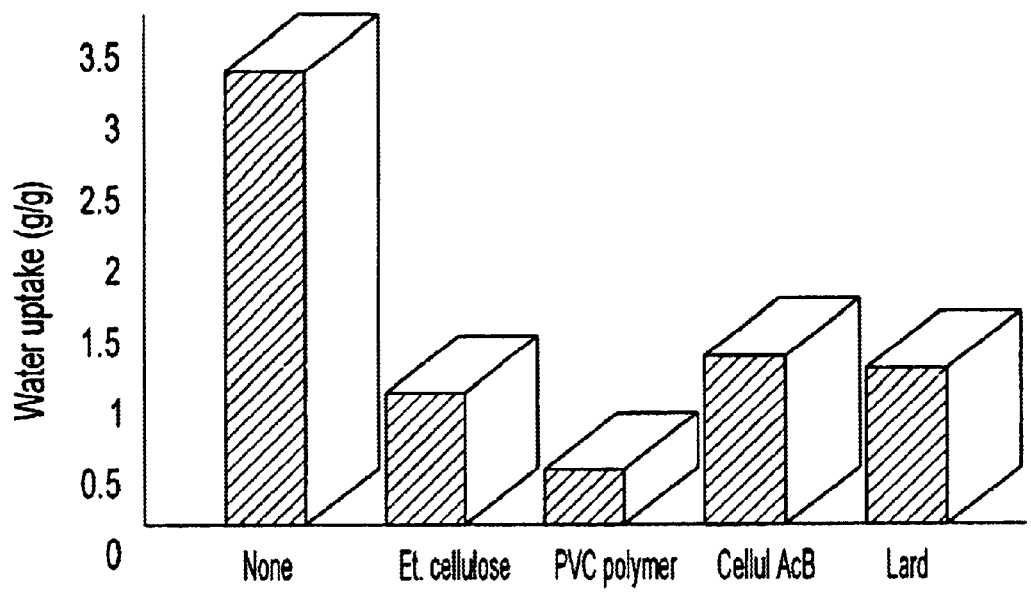
FIG. 1 is a chart illustrating water uptake of various hydrophobic coatings.

The present invention comprises methods of manufacturing and employing effective floating wick-like devices to support the ignition and efficient burning of spilled oil on water. Ideally, these devices should be lightweight and suitable for aerial delivery by fixed-wing aircraft so that distant spills can be addressed in a timely fashion. They should remain buoyant for several days after the burn to allow recovery. Because complete recovery of the devices is unlikely, they should be completely biodegradable. To minimize hazards to sea animals and fish, they should be non-toxic when ingested and retain as little absorbed oil as possible after use. To minimize hazards to workers, all components should burn cleanly without the formation of toxic gases. Moreover, the size and shape should allow rapid, sustained burning in the presence of waves yet permit optimal aeration to ensure clean burning of oil with minimal smoke.

Four elements are required to burn oil on water: fuel, oxygen, sufficient heat to cause volatilization and a source of ignition to initiate combustion. Oil in its liquid phase does not burn, and therefore oil must be heated to a temperature to vaporize hydrocarbons to support combustion in the air above the slick. The fire point is the temperature a few degrees above the flash point (temperature where oil can be ignited) where evaporation of hydrocarbons is sufficient to support continuous burning. Even when ignition is achieved, the temperature at the oil-water interface is never more than the boiling point of water and is usually less, and therefore the thickness of the slick is critical in maintaining a steep thermal gradient between the surface and the underlying water. In contrast, a simple oil lamp or smudge pot achieves fire point not by heating the oil reservoir, but by causing oil to rise continuously by capillary action up an absorbent where a small mass of oil encounters a high-temperature flame resulting in volatilization and combustion. Because the absorbent wick is typically also a thermal insulator, significant heat is not lost to the underlying oil reservoir and combustion is maintained until the fuel supply is depleted.

The problem of burning oil on water is somewhat more complicated than using a wick to burn a reservoir of pure oil. The hydrophobic nature of oil causes a slick to rapidly expand until it reaches equilibrium thickness determined by the oil's composition. By applying a floating absorbent to serve as a wick, spilled oil is offered an alternative avenue of escape from the water's surface. Oil accumulates on the wick, providing a thick insulating layer similar to that obtained by containing oil in booms. The oiled environment surrounding a floating wick can be viewed as a gradient where a thick oil layer accumulates immediately adjacent to the wick, thinning outward to equilibrium thickness. Therefore, once ignition is achieved, the burning area exceeds that of the wick itself and is determined by the nature of the oil and the size and absorbency of the wick. Where the thickness of a slick is sufficient, ignition of the entire surface would conceivably occur.

Various materials could be used to form the wick. It is preferable that the material have some oleophilic and hydrophobic properties and be comparatively inexpensive. Oleophilic means having a maximum affinity for oils. In terms of the present invention, a material is oleophilic where it absorbs (has an oil uptake capacity of) at least about 2 grams of oil for every gram of the material (g/g). Hydrophobic is used herein to mean having a minimum affinity for water. A material will be considered hydrophobic where is has a water uptake capacity of less than 5 g/g. Cellulosic materials typically are readily available and may form the base material for the wick. Cellulosic materials will typically be derived from plants. Illustrative examples of cellulosic materials which could be used in the present invention include bagasse (the rinds of sugar cane remaining after processing), corn cobs, kenaf(a fiber crop), peanut hulls, rice hulls and rice and wheat straws. These materials will typically be dried (e.g. at 45° C. for 48 hrs.) and then ground in a small hammer mill or like machinery. The ground material was then passed through a 3-mm screen and only material smaller than 3-mm was used. Other materials included sawdust, dried and passed through a 3-mm screen and woodchips dried and passed through a 25.4-mm screen. Newspaper and brown paper pulp can be employed by partially hydrolyzing shredded paper in a boiling solution of 0.2 NaOH. The pulp then is neutralized with HCl, dried at 45° C., and pulverized. Another material comprises various forms of cotton, including woven and braided material as well as fibers and partially hydrolyzed fibers. As seen with the experimental examples disclosed below, kenaf proves to be a preferred material from which to construct the wicks. It is also desirable that the cellulosic materials be unrefined cellulosic materials, including lignin containing cellulosic materials. Lignins are amorphous polymers related to cellulose that provide rigidity and together with cellulose, form the woody cell walls of plants and the cementing material between them. As used herein, "unrefined cellulosic materials" means cellulosic materials have lignins and/or other components typically found in natural cellulose such as hemicelluloses, waxes, oils and other compounds acting to confine water to plant vascular tissues and to inhibit water uptake by plant structural components. It is believed that unrefined cellulosic materials (as opposed to purified cellulosic materials such as disclosed in the Marx patent), have a superior ability to maintain water resistance over a wide range of temperatures.

While the above disclosure describes using cellulosic materials, it is envisioned that other materials could be used to construct the wicks. It is only necessary that these materials be buoyant (have a density less than water), be acceptably oleophilic and hydrophobic, and be able to support burning for several hours without losing structural integrity. As discussed, it is also desirable for the material to be nontoxic and biodegradable.

The material used to construct the wick must be held together with some type of binding agent. A suitable binding agent should have several properties. Binding agents should maintain the structural integrity of the floating wicks for sufficient time to allow recovery after burning. Because of the likelihood that the wicks will be distributed within the environment, binding agents should be both biodegradable and food-safe. Also, because of the high-temperatures anticipated, binding agents that included cyanate or significant numbers of C—N bonds should be avoided to eliminate the possible formation of cyanide or other toxic gases during burning. Among the various agents tested were pastes of wheat and corn flour, gum arabic, and polymers of cellulose acetate and cellulose butyrate. Cellulose polymers of various densities were obtained by dissolving different amounts of cellulose acetate and ethyl cellulose butyrate inorganic solvents prior to mixing with the absorbents. Commercially available latex adhesives and aliphatic emulsions (woodworking adhesives) were also tested. While these may act as acceptable binding agents, a preferred polymer comprises a cross linked polyvinyl acetate ("PVA") such as available under the tradename Tite Bond II from Franklin International, Columbus Ohio and which complies with ASTM D4236 (designating the polymer as "food-safe"). This liquid formulation is both hydrophobic and oleophilic and provided good adhesion when diluted with two to three parts water. Other suitable polymers for use as binding agents that offer adequate resistance to aliphatic and aromatic hydrocarbons include diallylphthanalate; polyolefins including polyethlene, polypropylene and polybutylene; polyesters including poly(butylene terephthalate) and poly(ethylene terephthalate); polymethylpentene; and various formulations of vinyls including poly(vinyl acetate), poly(vinyl alcohol) and poly(vinyl butyral). These and other vinyl based compounds are especially attractive because of their adhesive qualities and limited resistance to water, ensuring that the devices will decompose within a reasonable time.

Figure 2:
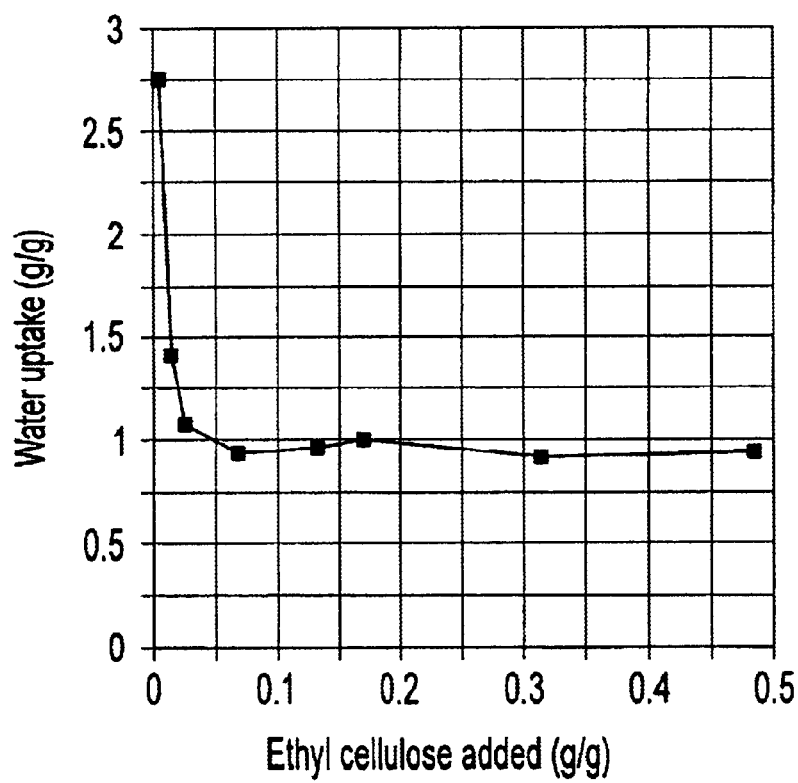
FIG. 2 is a chart illustrating the hydrophobic effect of ethyl cellulose.
Figure 8:
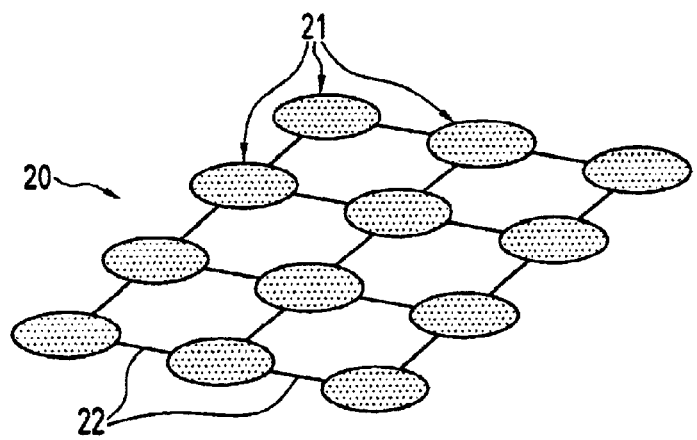
FIGS. 8 and 9 illustrate an embodiment wherein the wicks are secured to a mat.

A number of experiments were undertaken to evaluate the ability of various coatings to minimize water uptake when applied to the exterior of the wicks. The beneficial effects of the more effective coatings are shown in FIG. 1. FIG. 1 represents the water uptake of 29 $cm^3$ hemispheres of recycled newspaper after being coated with the substances indicated (ethyl cellulose, polyvinyl chloride polymer, cellulose acetate butyrate and lard). The water uptake is measured in grams of water per gram of material (g/g). All of the coatings shown in FIG. 8 are rated as "food-safe." In one test, ethyl cellulose and cellulose acetate butyrate were suspended in toluene: acetone before application. FIG. 2 shows that very little ethyl cellulose was required to obtain optimal reduction in water uptake of these small hemispheres. This polymer is used extensively in the production of cellophane and other similar biodegradable products used in food packaging. The cross-linked PVC polymer used is also rated as "food-safe" and is easily handled with no volatile emissions.

Figure 3:
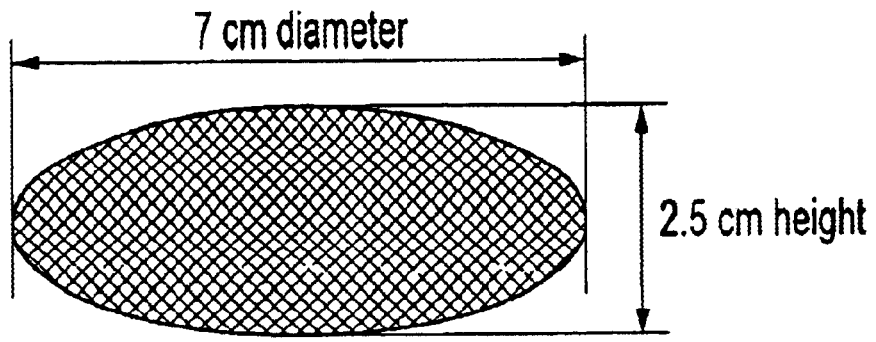
FIG. 3 illustrates a typical elliptical shape of a wick of the present invention.
Figure 4:
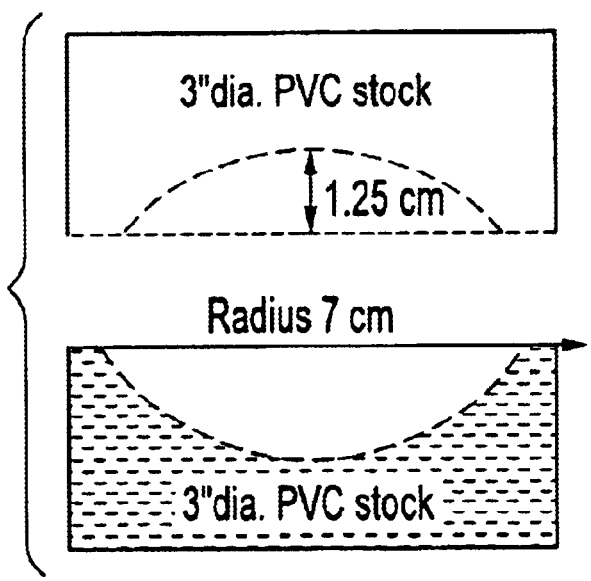
FIG. 4 illustrates a mold used to form the elliptical shape seen in FIG. 3.

One preferred method of producing the wicks starts with providing a loose cellulosic material, such as kenaf ground to the 3 mm size as discussed above. The cellulosic material will then be saturated in a binder substance such as a solution of 3:1 water to PVA. The saturated material is then pressed into the ultimate wick shape. The wicks could be formed into various shapes, including geometric shapes such as spheres, hemispheres, cones, cylinders, ellipsoids, and rectangular solids of various dimensions. When dealing with ellipsoids, such as seen in FIG. 3, the size could vary from a height of about 1 cm to about 5 cm with a corresponding diameters of about 2.8 cm to about 14 cm. However, one preferred embodiment comprised an ellipsoid shape having a height of about 2.5 cm and a diameter of about 7 cm. One manner of forming wicks is to place a predetermined amount of the cellulose material, still wet from mixture with the binding agent, into a mold as seen in FIG. 4. The molds seen in FIG. 4 are two cylindrical sections of PVC stock which have had a half ellipsoid formed into each end. The molds are then pressed together with sufficient force to insure the mixture is completely contained within the mold and the excess binding agent is pressed out of the material. After allowing a short period of time sufficient for the binding agents to "set," the wicks may be removed and placed on an appropriate surface (such as a Teflon sheet) for drying. The wicks will then be dried, preferably at about 105° C., until no further significant loss in weight occurs (typically less than 5% water content). The wicks will then be dipped in an oleophilic, hydrophobic coating substance. In a preferred embodiment, the coating substance is a 3:1 water to PVA solution. The dry wicks are submerged in the solution and then pulled from the solution. After dipping the wicks, it is beneficial to place them in a wire cage sufficiently flat that the wicks are fixed in place when the cage is closed. The cage is then slowly rotated until the coating becomes tacky. This rotation prevents the coating (while in the non-tacky state) from accumulating on one surface of the wick. The wicks will again be dried until weight loss ceases. For example, drying at 200 C for two hours was sufficient for the preferred wick size described above.

EXPERIMENTAL EXAMPLES

Several criteria were used to initially assess the performance of various designs. These criteria included: (1) uptake of oil and water while floating on an oil-water interface and during burning, (2) tolerance to burning, (3) ability to maintain structural integrity and float for 7 days, and (4) efficacy in burning a 1-mm oil slick. The methods for measuring these criteria are as follows.

1. Measuring Basic Criteria.

1.1 Uptake of oil and water. To measure the relative uptake of oil and water, wicks were weighted and then placed in a 600 ml beaker containing 400 ml tap water and sufficient South Louisiana Sweet crude oil or diesel fuel to provide a slick thickness of 2-mm. After 2 hours, the devices were removed, placed in tared 500 ml widemouth jars, and the weight after adsorption measured to determine uptake of both oil and water. To determine the amount of oil absorbed, a wick was then chopped into a number of pieces and mixed with 250 ml of tetracholorethylene (TCE). The jar was fitted with an air-tight, teflon-lined lid, and placed in a sonifier for 2 hours. An aliquot was quantitatively diluted for analysis of total petroleum hydrocarbons (TPH) using a Buck Scientific Model HC-404 Total Petroleum Analyzer (Westport, Conn.) standardized using known dilutions of the oil used in the test. To determine the weight of the absorbent after burning, the TCE remaining after TPH analyses was decanted, the absorbent washed with 50 ml TCE, and dried in an oven 65° C. for 4 hours, and then 125° C. for 4 additional hours. The total amount of oil absorbed was calculated and subtracted from the weight gain after absorption to determine water uptake. The results seen in the following Table 1 represent the average uptake of water and oil by three replicate hemispheres comprised of various absorbents bonded and coated with a 3:1 mix of water and an aliphatic adhesive emulsion. The volume of the wicks was about 30 cm$^3$.

TABLE 1

| Absorbent[†] | Initial wt (g) | Coating (g) | Water uptake (g) | (g/g) | Oil uptake (g) | (g/g) |
|---|---|---|---|---|---|---|
| bagasse | 8.00 | 0.57 | 13.3 | 1.7 | 21.5 | 2.7 |
| corn cobs | 6.55 | 0.83 | 18.6 | 2.8 | 19.4 | 3.0 |
| kenaf | 6.55 | 1.4 | 16.1 | 2.5 | 17.6 | 3.9 |
| recycled paper | 5.29 | 0.33 | 20.8 | 3.9 | 15.5 | 2.9 |
| cotton | 5.30 | 0.32 | 6.9 | 1.3 | 26.5 | 5.0 |
| Blend 1 | 7.58 | 0.84 | 14.0 | 1.8 | 21.0 | 2.8 |
| Blend 2 | 5.78 | 0.81 | 12.9 | 2.2 | 19.4 | 3.4 |
| Blend 3 | 5.49 | 0.91 | 20.1 | 3.7 | 17.5 | 3.2 |
| Blend 4 | 4.91 | 0.72 | 15.74 | 3.2 | 16.0 | 3.3 |
| lsd (p < 0.05) | 0.21 | 0.13 | 1.1 | 0.4 | 2.9 | 0.4 |

[†]Blend 1: equal weights of corn cobs, recycled paper and cotton; Blend 2: equal weights of kenaf, bagasse and cotton; Blend 3: equal weights of corn cobs, bagasse and recycled paper; Blend 4: equal weights kenaf, bagasse and recycled paper.

1.2 Tolerance to burning. Excessive combustion of the absorbent material reduced the effectiveness of some materials. To test their tolerance to burning, the weight loss of the wick upon burning in a 1-mm slick was determined (see 1.1 above). In some cases excessive burning of the wick was clearly evident, and precise measurements were unnecessary. To test the capacity of the final designs to tolerate burning, three wicks were placed in a diesel slick with an initial thickness of 1 ml. A peristaltic pump was adjusted to deliver 250 ml of diesel per hour. The pump was momentary switched off when it appears that the slick had developed sufficient thickness to support combustion of the entire surface. Once surface oil was partially depleted, the pump was restarted. The wicks were ignited and the experiment terminated after the combustion of 5 L of fuel. It was apparent from the burning tests that rice and peanut hulls, along with rice and wheat straws, burned to an excessive degree and would be less preferred materials for the wicks. Bagasse, corn cobs, kenaf, recycled paper and cotton withstood burning sufficiently well.

Figure 5:
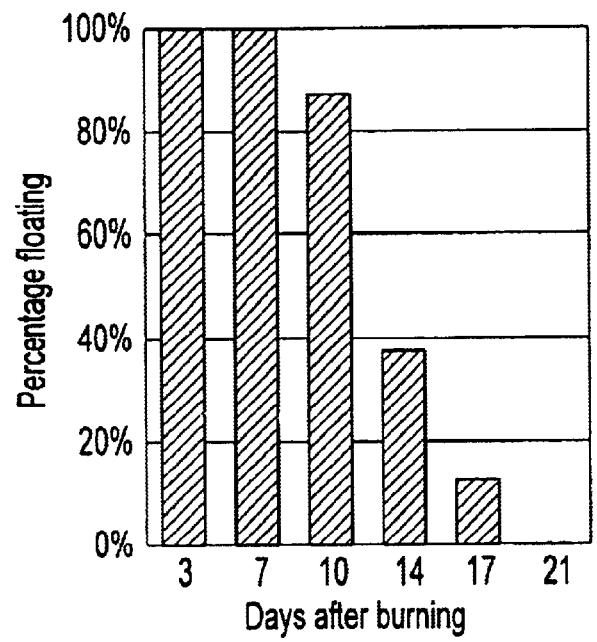
FIG. 5 is a chart illustrating the long term bouncy of the wicks.

1.3. Structural integrity and buoyancy. Designs that easily crumbled or disintegrated during burning were immediately rejected. Those that demonstrated promise were floated on water for 7 days. Sinking or disintegration during that time caused the design to be rejected. From various tests, kenaf appeared to be a preferred material. To evaluate the buoyancy of the final material, eight wicks of this material constructed as described above were placed in a water bath containing a 1-mm slick of Louisiana sweet crude oil, and ignited. Once burning was complete, the spent wicks were left floating and placed in a fume hood for 21 days at room temperature (22–24° C.). The number floating after various intervals was recorded. The results of this experiment are seen in FIG. 5.

1.4 Efficacy in burning oil. The capacity of various wicks to burn oil was initially assessed in the laboratory using oil slicks contained in stainless steel rectangular pans (23.5× 30.0 cm) 10-cm in height. 4.5 liters of water was placed in the pan and a volume of oil added to establish the specified slick thickness. Placing these wicks in fuel oil (diesel) slicks of >1.5 mm invariably ignited the entire slick surface, resulting in a violent fire that caused boiling over of the underlying water. A 1-mm initial slick thickness was selected for routine use not only to minimize hazards, but because it more typically represents the thickness in an unconstrained slick after a few hours on water. To determine the volume of oil resulting in a specific slick thickness, pans were initially calibrated by calculating the average increase in fluid level resulting from replicate additions of 200 ml aliquots to pans containing 4.5 liters of water at 22–23° C. These calculations indicated that 70.5 ml of oil was needed to establish a 1-mm layer of oil floating on the water surface.

After the addition of the oil, the pans were allowed to stand in a fume hood for 30 minutes to allow the oil to evenly spread over the water surface. The window of the hood was adjusted to provide an simulated average wind speed of 17 mph. Wicks were dropped onto the oil surface and allowed to absorb oil for 5 minutes before ignition using a Bunsen burner supplied with natural gas. The burn times of the initial lighting and after additional relights were recorded. When more than one wick was used, relighting frequently occurred spontaneously when an extinguished wick collided with a burning wick. After testing, the wicks were removed and the amounts of oil retained and remaining on the water surface measured. The amount of oil burned was calculated as the difference between the amount of oil initially present minus that recovered as absorbed or from the water. The amount burned was divided by the total time between the initial lighting until the end of the burning.

The volume of oil retained by the wicks after burning was determined by the TCE extraction procedure described in Section 1.1, except in these experiments the TPH Analyzer was calibrated using oil similar to that recovered from the water surface after burning. After removal of extinguished wicks, approximately 3 L of water was drained from the bottom of test pans. The remaining 1.5 L was transferred to a 2-L Erlenmeyer flask with a narrow neck, using a wash bottle to recover film on the sides of the pan. Water was then added to the flask to raise the oil level about half-way up the neck of the flask. Cleaning of the flask between samples with TCE was necessary to prevent beads of oil from adhering to the flooded sides of the flasks. After transfer, the flask was capped and allowed to stand for 2 hours to allow any emulsified during the transfer process to separate and rise. The flask was then placed on an adjustable jack stand, and the oil layer withdrawn using a 50-ml beret fitted with a stainless steel blunt needle tip and a hand vacuum pump. Once all of the oil was taken into the beret, the difference between uppermost and bottom minisci of the oil column was taken as a measure of the volume of oil recovered. Careful manipulation of the jack stand and hand pump resulted in excellent recovery and quantification of remaining oil. 10-ml samples of oil pipetted onto the water surface could be recovered with less than 2% error. The diesel fuel oil was dyed with Sudan IV to facilitate its recovery using this technique. Table 2 shows the average burning characteristics of three replicate hemispheres comprised of different absorbents and coated by dipping in a 3:1 mix of water and an aliphatic emulsion. The wicks were ignited in a 1-mm slick of diesel fuel. The volume of all devices was 30 cm$^3$.

TABLE 2

| Absorbent† | Oil retained after burn ml | Avg. relights required | Final slick thickness mm | Total burn time min | Burn rate ml/h |
|---|---|---|---|---|---|
| bagasse | 9.6 | 4.0 | 0.35 | 83.9 | 26.0 |
| corn cobs | 8.4 | 2.3 | 0.34 | 66.8 | 34.9 |
| kenaf | 5.4 | 2.0 | 0.15 | 104.0 | 31.7 |
| recycled paper | 7.7 | 2.0 | 0.47 | 71.1 | 25.4 |
| cotton | 10.1 | 3.7 | 0.46 | 12.1 | 105.5 |
| Blend 1 | 8 | 1.6 | 0.29 | 77.2 | 33.2 |
| Blend 2 | 6.3 | 2.0 | 0.29 | 98.7 | 26.9 |
| Blend 3 | 8.8 | 3.3 | 0.25 | 112.8 | 23.7 |
| Blend 4 | 7.2 | 3.3 | 0.35 | 103.0 | 22.5 |
| lsd (p < 0.05) | 3.9 | 0.6 | 0.17 | 19.5 | 12.4 |

†Blends are the same as specified for Table 1.

1.5 Burning emulsified oil. Wind and waves can rapidly mix spilled oil and water to form an emulsion. Current guidelines do not recommend in situ burning when oil contains more than 25% water. Preliminary experiments using various coating on kenaf ellipsoids indicated that the affinity of oil for kenaf was sufficient to break oil-water emulsions provided a hydrophobic coating was applied. To assess the ability of wicks to burn emulsified oil, 400 ml of water and 100 ml of diesel or crude oil were placed in a blender and mixed at high speed for 10 minutes. The emulsion was immediately poured to pans containing 4 L water. Wicks were placed in the emulsion, and after 5 minutes, ignited with a Bunsen burner. After burning, the aqueous phase was transferred to 500 ml centrifuge bottles and centrifuged at 5000 g (gravity) for 30 minutes. A preliminary study indicated that this procedure effectively separated the oil and water, though the water phase remained slightly turbid even after prolonged centrifuging. After separation, the oil was quantified using the beret technique described above.

Figure 6:
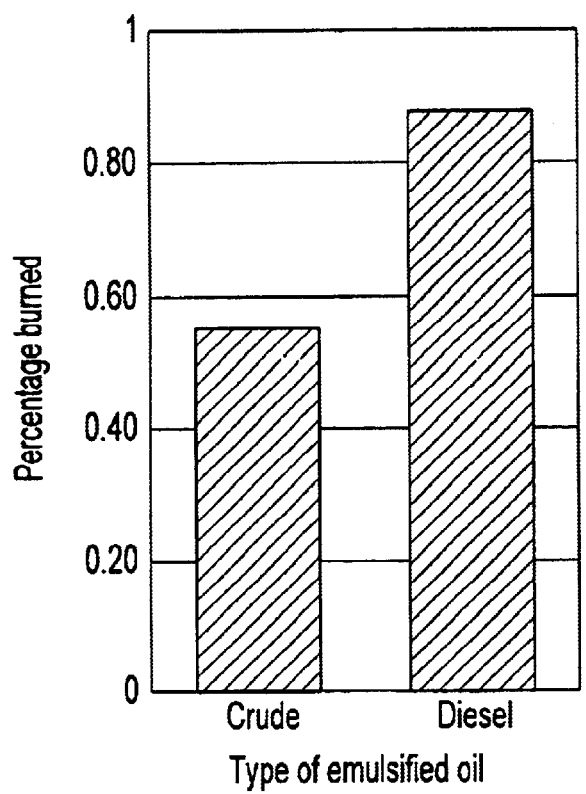
FIG. 6 is a chart illustrating the results of burning emulsified oils.

FIG. 6 shows that portion of oil burned in these extreme instances of emulsification. Emulsified diesel burned somewhat slower but as completely as non-emulsified diesel. A substantially smaller portion of emulsified crude oil was burned, however. These differences may have been due to the fact that diesel emulsions more readily dissociate. A thin layer on non-emulsified diesel was observed within minutes of preparing the emulsion and adding it to a water bath. Over half of the emulsified crude burned during these experiments, and nearly 90% of emulsified diesel burned. Since there are few highly effective tools for cleanup of emulsified oil on water, use of these wick appear to offer at least a partial solution.

1.6 Evaluation of Wick Shape

A large number of shapes and sizes were tested. Preliminary testing eliminated many inappropriate designs. Table 3 shows the results of a replicated study to determine the more effective of several promising designs. The composition and density of each design were similar. These data suggest that an ellipsoid shape with a volume of 88 cm$^3$ was the most effective even though it required an average of at least two relightings to complete burning. Table 3 illustrates the efficacy of various shapes used to ignite and burn a 1-mm diesel oil slick.

TABLE 3

| Shape† | Volume cm$^3$ | Dry wt. g | Oil retained after burning g | Relights | Final slick thickness mm |
|---|---|---|---|---|---|
| cone | 16.5 | 4.4 | 3.2 | 3.67 | 0.34 |
| cone | 50.0 | 14.6 | 7.8 | 2.67 | 0.36 |
| tapered cylinder | 28.3 | 8.3 | 5.5 | 0.67 | 0.33 |
| hemisphere | 27.9 | 7.5 | 4.3 | 2.67 | 0.45 |
| hemisphere | 43.2 | 13.1 | 6.7 | 4.33 | 0.24 |
| hemisphere | 72.5 | 17.6 | 9.8 | 2.67 | 0.21 |
| sphere | 139.0 | 13.8 | 14.9 | 1 | 0.19 |
| ellipsoid | 36.3 | 5.0 | 3.7 | 2.33 | 0.18 |
| ellipsoid | 88.3 | 13.4 | 6.1 | 3.33 | 0.08 |
| ellipsoid | 127.4 | 16.4 | 13.1 | 4.67 | 0.14 |
| lsd (p < 0.05) |  | 1.1 | 3.4 | .87 | .10 |

†All devices were comprised of kenaf using a PVA polymer as a binding agent and exterior coating. Three replicates of each design were tested.

These designs resulted in the combustion of more than 80% of the oil initially present and an average final slick thickness of only 0.08 mm. A sphere also performed well and early studies focused primarily on spherical devices because they supported rapid and clean burning. A curved or dome shaped surface rising above the water level tends to both remove the flame from the water surface and provide a greater surface area for burning. This greater surface area allows the burning oil access to oxygen, resulting in a more complete (i.e. cleaner) burn. However, spheres have a tendency to roll, extinguishing the flame. Hemispheres generally outperformed spheres of the same diameter when the flat surface faced downward, but performed more poorly when placed with the flat surface facing upward. A simple experiment involving the random dropping of hemispheres from a height of 2 m into water showed that these objects had an equal chance of floating in either position. Because we envisioned aerial dropping of these devices, this property reduced the value of hemispherically shaped devices.

The dome-shaped surface of a sphere or hemisphere that contributes to the effectiveness of these shapes is a characteristic shared by the ellipsoid. Ellipsoids have an additional advantage in that regardless of how they are applied to an oil slick, a dome-shaped surface is ensured of floating in an upward position. The diameters of ellipsoids with volumes of ~90 cm$^3$ and heights of 2.5 cm were only about 7 cm. in diameter. Much larger ellipsoids were tested but found to be less effective largely because they retained a greater amount of absorbed oil after burning, and because oil diffusion and oxygen availability appeared to limit the size of the flame and the efficiency of the burn. Several smaller ellipsoids burning in close proximity were capable of burning a greater percentage of oil in thin slicks than a single large device. For slicks with a thickness of more than 1.5–2 mm, size is less important because the entire slick surface is quickly ignited by both large and small devices.

1.6 Burning Slicks of Various Thickness

The capacity of one preferred embodiment, 90 cm$^3$ ellipsoid devices comprised of kenaf bonded and coated with PNA polymer, to burn slicks of various thicknesses was evaluated using diesel as a fuel source (Table 4). Diesel and related lightweight fuels are frequently spilled in marine environments, but because of the difficulty in igniting these fuels, in situ burning is not generally considered an appropriate response. Lightweight fuels disperse rapidly on the water's surface. Even when confined, applying a continuous heat source to a diesel slick will not result in the entire slick's ignition unless confined to establish a thickness of ~2 mm. In comparison, mildly weathered crude oil is far easier to burn. The wicks used in the experiments reported in Table 4 were dipped in a flammable liquid prior to use. The flammable liquid could comprise several alternative light oils (e.g. shorter aliphatic chains of 8, 10 or 12 carbon atoms). One preferred flammable liquid is mineral spirits. Normally the wicks would be submerged in the flammable liquid for about 5 seconds and then allowed to drain. While other experiments show that these devices will effectively burn slicks as thin as 0.15 without a flammable starter liquid, dipping these devices in mineral spirits facilitates their ignition, accelerates burn rate, and decreases the total amount of petroleum hydrocarbons remaining on the water's surface. From 39–93% of the diesel spilled on to the water's surface was burned. The efficiency of the burn tended to increase with increasing slick thickness. When a slick 2-mm thick was ignited, the entire surface burned as evident by the short total burn time. Even so, the slick thickness after the burn was among the least. This finding suggests that boom confinement where feasible will increase both the rate and efficiency of burning. Table 4 illustrates the ability of kenaf ellipsoids to burn diesel slicks of various thicknesses on water (at a temperature of 25° C.).

TABLE 4

| Initial slick thickness mm | Total burn time min | Oil retained after burning ml | Slick thickness after burn mm | % Burned or volatilized |
|---|---|---|---|---|
| 0.25 | 15.6 | 4.9 | 0.08 | 38.9% |
| 0.50 | 16.6 | 6.9 | 0.12 | 57.6% |
| 0.75 | 23.2 | 1.8 | 0.10 | 83.6% |
| 1.00 | 27.9 | 4.5 | 0.14 | 80.1% |
| 1.50 | 20.9 | 4.8 | 0.19 | 82.5% |
| 2.00 | 8.0 | 4.9 | 0.08 | 92.6% |
| lsd (p < 0.05) | 3.2 | 2.8 | 0.05 | 9.8 |

The longest burn time (27.9 min) occurred in the 1-mm slick. With exception of the 1.5 and 2.0 mm slicks where the oil surface partially or completely burned, burn time was strongly correlated to the amount of oil burnt. This finding supports other observations suggesting that increasing the density of the devices results in a corresponding reduction in time of burn. No clear relationship between the amount of oil retained by the devices after the burn and the initial slick thickness was evident. While the water temperature of the Northern Gulf Coasts is usually moderate, water temperatures in other oceans are frigid. Temperature influences the viscosity of oil, and conceivably low water temperature could reduce the ability of oil to flow to these devices. To determine the effect of water temperature on the efficacy of burns, experiments were conducted using an initial water temperature of 5° C. (Table 5). As in the experiments reported in Table 4, diesel was used as the source of fuel.

The most noteworthy effect of cold water was a lengthening of total burn time. The amount of oil retained by the ellipsoids after burning was similar to burns in warm water. The percentages of oil burned and final slick thicknesses were similar to the corresponding slick thickness burned at an initial water temperature of 25° C. These finding suggests that water temperature is not a principal determinant of whether in situ burning will be successful. Water temperature may have had a more significant effect if heavier crudes or oils had been used in place of diesel. Table 5 illustrates the ability of kenaf ellipsoids to burn diesel slicks of various thicknesses on cold water (i.e. 5° c.).

TABLE 5

| Initial slick thickness mm | Total burn time min | Oil retained after burning ml | Slick thickness after burn mm | % Burned or volatilized |
|---|---|---|---|---|
| 0.25 | 32.5 | 4.6 | 0.08 | 38.9% |
| 0.50 | 30.3 | 5.7 | 0.12 | 57.6% |
| 0.75 | 33.0 | 6.3 | 0.10 | 83.6% |
| 1.00 | 31.4 | 4.5 | 0.14 | 80.1% |
| 1.50 | 31.2 | 4.4 | 0.19 | 82.5% |
| lsd (p < 0.05) | 4.8 | 2.4 | 0.04 | 6.9 |

Burning of Heavier Oils.

Guidelines established to aid on-site coordinators in determining whether in situ burning offers an appropriate response to a spill specify that spilled oil must be weathered less than 25%. These same guidelines also require a minimum slick thickness of 2–3 mm, depending on the type of oil. An experiment was performed to determine if these devices could facilitate the ignition and burning of 1-mm thick slicks of heavily weathered South Louisiana crude and diesel oil (Table 6). Motor oil (SAE 30) was also tested as a worst-case material, since this refined oil contains few volatile and semi-volatile compounds to support ignition and burning. Crude weathered to reduce it's mass by 10% and 30% burned as readily as similar slicks of unweathered crude. However, weathered diesel did not burn as completely as did unweathered diesel. Final slick thicknesses for weathered diesel ranged from 0.12 to 0.21 mm, though no differences in final thickness were observed between diesel weathered to 10% and 30%. Motor oil burned poorly and with considerable emission of soot. Nevertheless, over 36% of motor oil applied as a thin 1-mm slick was consumed. A slick with sufficient thickness to support surface combustion conceivably would have elevated temperatures and resulted in a more satisfactory burn of the longer-chained hydrocarbons in motor oil. Table 6 illustrates the ability of kenaf ellipsoids to burn motor oil and weathered crude and diesel oil.

TABLE 6

| Fuel source | Total burn time min | Oil retained after burning ml | Slick thickness after burn mm | % Burned or volatilized |
|---|---|---|---|---|
| Crude | 36.3 | 5.9 | 0.19 | 72.0% |
| 10% weathered Diesel | 37.1 | 5.7 | 0.07 | 84.5% |
| 10% weathered Crude | 34.1 | 6.5 | 0.14 | 76.0% |
| 30% weathered Crude | 33.2 | 7.1 | 0.09 | 81.1% |
| 30% weathered Motor oil (SAE 30) | 16.6 | 9.8 | 0.48 | 36.6% |

1.8 Maximum Capacity to Burn Oil

A simple experiment was performed to determine the capacity of 90 cm$^3$ devices to burn crude oil. The wicks tested were comprised of kenaf, and bound and coated with a PVA polymer. Three of these devices were placed in 1-mm thick slick of diesel and ignited. A pump then was adjusted to deliver a continuous supply of fuel to maintain a slick sufficiently thin to avoid ignition of the entire surface. Under these conditions, no relighting of the wicks was required. This observation supports the suggestion that the need to relight is the result of reduced oil diffusion across a weakening gradient within the devices as the surface oil is depleted. The experiment was terminated after combustion of 5 L of diesel because the devices showed no significant signs of deterioration. After extraction of oil and drying, the wicks appeared to have lost less than 1.5 g, or less than 8% of their initial weight. This loss is only slightly greater than the 0.7–0.8 gloss observed when these devices are used to burn only 70–100 ml of oil. This finding suggests that devices of kenaf have a very large capacity to burn oil even when the entire slick surface is not ignited.

1.9 Potential Applications

The present invention has utility in many circumstances where traditional in situ burning was not possible or not practical. As one example, the rapid spreading of oil on water complicates traditional approaches to in situ marine burning. However, the fact that within a few hours most slicks will not support sustained combustion suggests a technique for burning slicks in close proximity to a damaged vessel or other object. If wicks are used in this situation, the fire is limited to the wick surface and does not spread to the slick as a whole. To explore this possibility, a demonstration was conducted using a small (3.7 m×3.7 m) pool constructed for this purpose. Two gallons of South Louisiana crude were poured onto the water's surface and a small plastic boat anchored nearby. The purpose of this demonstration was to determine whether the oil could be burnt without endangering the boat. When the demonstration was carried out, the majority of the oil was absorbed onto the wicks and burnt without damage to the boat.

When blowouts and other inland spills occur, rainfall often causes free-phase oil on vegetation and soils to migrate into small slow moving or stagnant tributaries where its recovery is difficult. A demonstration was conducted to determine if these wick devices could be used to address such conditions. Two quarts of Louisiana Sweet Crude were introduced into a small tributary. Several wicks were placed on the small slick and the wicks ignited. A significant majority of the oil was removed by burning. The most significant problem was keeping the wicks in contact with the oil as the slick was burnt and/or dispersed. One potential solution could be using a small boom or blower to consolidate oil for burning. When a wick floats into an area where it threatens to catch vegetation or shore debris on fire, the wick could easily be extinguished by pushing it below the water surface. When it resurfaced, the wick would be relit by moving it adjacent to a burning wick. An interesting finding of these demonstrations was that these wicks need to only come into contact with oil a small percentage of the time to maintain the burn. When in contact, the wick is quick recharged with oil for several more minutes of burning.

Figure 7:
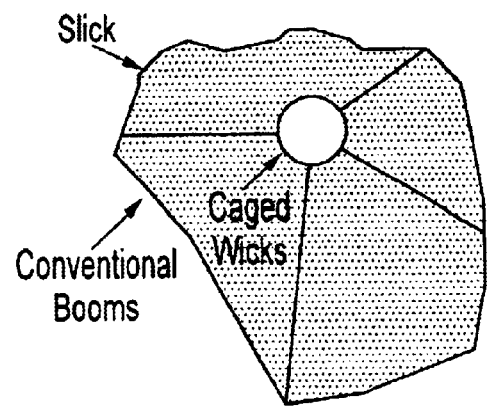
FIG. 7 is a diagram illustrating one method of deploying wicks within a oil slick.

When spills occur near shore, rapid containment of oil with booms to prevent spreading is a principal priority. However, not all environments and conditions permit rapid deployment of equipment to recover and store the spilled oil once it is contained. FIG. 7 diagrams a simple technique employing a floating "cage" 14 to contain these wicks and to permit burning of spilled oil 10 using conventional booms 12. After confirming that the uppermost edge of the contained slick is not sufficiently thick to support combustion of the entire oil surface, the floating cage 14 could be deployed, filled with wick devices and maneuvered via cables 16 into the slick where it is ignited. As the slick is consumed, the cage 14 may be repositioned to maintain contact with the oil 10.

A simulation was conducted to test the viability of this concept and to determine the rate at which these wicks could burn diesel oil when contained by a "cage." Using a 950 cm$^2$ (~1 sq. ft) cage containing 16 wicks, diesel fuel was metered onto a 2560 cm$^2$ surface using a peristaltic pump. The rate was adjusted to obtain a steady rate of burn within the cage while avoiding a build up of slick thickness. If an excessive rate was used, the thickness of the slick would increase to a point where the entire surface would combust, emitting large volumes of smoke and condensate. A flow rate of 50 ml diesel/min maintained constant combustion. When the burn was maintained at this rate, oil supply rather than oxygen appeared to limit combustion rate and very little particulate emission was observed. Oil addition was terminated after 5 L of diesel were added. After the burn, only 34 ml of unburnt oil were recovered from the water's surface. These findings suggest that each square foot occupied by these wicks will burn about 0.8 of oil gallons per hour. However, this small scale study should not be viewed as a prediction of the behavior of burns of several hundred or several thousand square feet. Oil diffusion rates, temperatures, winds generated by the fire and oxygen supply are likely to be significantly different when burning large areas.

These experiments suggest efficacious oil burning wicks should possess certain characteristics. For example, the wicks should be capable of remaining ignited while floating in an oil slick for some minimum period of time. This parameter may be defined as "oil/water burn time." As used herein, oil/water burn time will be the time a floating wick remains ignited while floating on a 1 mm oil slick on water. In a preferred embodiment of the present invention, the oil/water burn time of a wick will be at least five hours, and more preferably 12 or more hours. This oil/water burn time of the present invention compares very advantageously with the maximum oil/water burn time of less than 45 minutes noted in experiments performed upon wicks constructed according to the Marx patent. Indeed, it is questionable whether a 45 minute oil/water burn time would be sufficient to burn any significant portion of a realistically sized oil-on-water spill.

Another characteristic of the wicks of the present invention will be an ability to remain hydrophobic after being ignited for a substantial period of time. This characteristic may be defined as "post-ignition floating density." As used herein, post-ignition floating density will mean the density of a floating wick in g/cc after the wick has been burning for 30 minutes. A post-ignition floating density of 1 g/cc would indicated that the wick has, for practical purposes, become completely saturated with water. In a preferred embodiment of the present invention, the wicks will have a post-ignition floating density of less than 0.5 g/cc. The post-ignition floating density parameter also compares favorably to the device disclosed in Marx, which were found to uptake large amounts of water after burning only 10 minutes or less.

Figure 9:
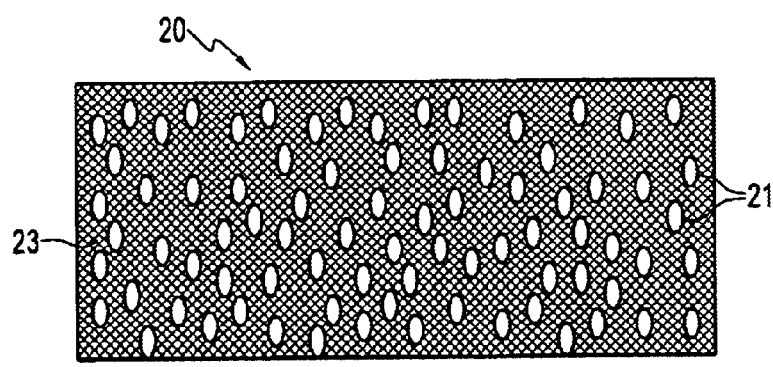

A somewhat similar concept to enclosing the oil burning wicks in a cage may be seen in FIGS. 8 and 9. FIG. 8 illustrates an array or "mat" 20 formed of individual oil burning wicks 21. Oil burning wicks 21 are constructed as described above. Mat 20 will be formed by inter-connecting oil burning wicks 21 with connecting lines 22. In a preferred embodiment, connecting lines 22 will be formed of some type of heat resistant material such as steel wire. However, any material which withstands the heat generated during the burning of the oil slick may be used. Additionally, while FIG. 8 shows the oil burning wicks 21 uniformly spaced, this is not a critical requirement. The employment of mat 21 has several advantages. Mat 21 allows for easier and more controlled placement of the wicks within the oil slick area. Mat 21 ensures that the wicks are uniformly distributed over the area of mat 21. Finally, mat 21 allows for easy and effective recovery of the wicks after the oil slick has been burned, since only a single mat need be recovered rather than hundreds or thousands of freely floating individual wicks.

Another variation of mat 21 is seen in FIG. 9. This mat 21 is formed of a mesh screen 23 which may be constructed of any suitable material including metal or fiberglass. The wicks 21 are then connected to the mesh screen 23 in any conventional manner. The mesh material need not be greatly heat resistant because it will generally rest just under the water surface. Nor should the terms "screen" or "mesh" be interpreted as applying only to a tightly woven material. The term "mesh" as used herein could include a net or web-like interconnection of material. In the embodiment shown, mat 21 is rectangular in shape and in one preferred embodiment, is 6 to 8 feet wide. This configuration allows mat 21 to be easily deployed as a roll from the stern of a vessel.

The present invention provides a novel and effective method for in situ burning of oil spills on water. It may seem counter-intuitive that devices only 7 cm in diameter can be effective in burning oil slicks on the open sea. Certainly when winds are sufficient to cause blowing spray and large, breaking waves, successful burning of an oil slick with these devices would seem difficult as would any other method of oil cleanup. However, the presence of oil on the surface tends to smooth the sea and prevent waves from breaking. There is no reason to doubt these buoyant, small devices would be effective in sea conditions that can support an oil slick at the surface, including large swells. Compared to atypical oil slick of less than 1-mm, these devices are large. Because these devices are inexpensive to manufacture, lightweight and easily handled, large numbers could be deployed to cause widespread burning when rapid oil removal is mandated. While the foregoing description has been of specific embodiments of the present invention, it will be understood that numerous alternate embodiments will be apparent to those skilled in the art and such alternate embodiments are intended to come within the scope of the following claims.

I claim:

1. A method for in-situ burning of liquid hydrocarbons on water comprising the steps of:
  a. providing a plurality of individual floating wicks, each of said wicks being formed of a lignin containing cellulosic material, having a coating of polyvinyl acetate applied thereto, having a dome shaped top section and having an effective oil/water burn time of at least five hours;
  b. positioning said wicks in an area of liquid hydrocarbons floating on a body of water;
  c. igniting said wicks.

2. The method of claim 1, wherein said step of providing wicks includes providing wicks having a post-burn density of less than 0.5 g/cc.

3. The method of claim 1, wherein said step of providing wicks includes providing wicks with a height of between about 1 cm and about 5 cm.

4. The method of claim 3, wherein said step of providing wicks includes providing wicks with a height of about 2.5 cm.

5. The method of claim 1, wherein said step of providing wicks includes providing wicks having an elliptical shape.

6. The method of claim 1, wherein said step of providing wicks includes providing wicks wherein said cellulosic material is one of the group comprising bagasse, corn cob, kenaf, recycled paper, or cotton.

7. The method of claim 1, wherein said step of providing wicks includes providing wicks which are formed of a non-toxic, biodegradable material.

8. The method of claim 1, wherein said step of providing wicks includes providing wicks which are formed of an oleophilic material.

9. The method of claim 8, wherein said step of providing wicks includes providing wicks wherein said oleophilic material has an oil uptake capacity of at least about 2 g/g.

10. The method of claim 9, wherein said step of providing wicks includes providing wicks with a water uptake capacity of no more than about 5 g/g.

11. The method of claim 10, wherein said step of providing wicks includes coating said wicks with a flammable liquid.

12. The method of claim 8, wherein said step of providing wicks includes providing wicks with a water uptake capacity of no more than about 5 g/g.

13. The method of claim 1, wherein said step of providing wicks includes coating said wicks with a flammable liquid.

14. The method of claim 13, wherein said step of providing wicks includes coating said wicks with a flammable liquid comprising a light oil.

15. The method of claim 1, wherein said step of providing wicks includes providing a plurality of wicks which are inter-connected, thereby forming an array of oil burning wicks.

16. The method claim 1, wherein said step of positioning said wicks includeds positioning said wicks in an area of spilled liquid hydrocarbons floating in a body of open water.

17. A method for in-situ burning of liquid hydrocarbons on water comprising the steps of:
  a. providing a plurality of individual floating wicks, each of said wicks being formed of a non-toxic, biodegradable lignin containing cellulosic material having a coating of polyvinyl acetate applied thereto and having an effective oil/water burn time of at least five hours;
  b. positioning said wicks in an area of liquid hydrocarbons floating on a body of water;
  c. igniting said wicks.

18. The method of claim 17, wherein said step of providing wicks includes providing wicks having an elliptical shape.

* * * * *